United States Patent [19]

Bivens

[11] 3,939,517
[45] Feb. 24, 1976

[54] OVERHEAD BRUSH SYSTEM WITH LATERAL MOVEMENT

[76] Inventor: David J. Bivens, 205 E. Lawn Ave., Danville, Va. 24541

[22] Filed: Nov. 29, 1973

[21] Appl. No.: 419,940

[52] U.S. Cl............................... 15/53 A; 15/DIG. 2
[51] Int. Cl.².............................................. B60S 3/06
[58] Field of Search............. 15/DIG. 2, 21 D, 21 E, 15/53, 97, 53 A, 53 AB

[56] References Cited
UNITED STATES PATENTS

| | | | |
|---|---|---|---|
| 2,579,866 | 12/1951 | Rousseau......................... | 15/DIG. 2 |
| 3,497,895 | 3/1970 | Oldham et al. .................... | 15/21 D |
| 3,601,833 | 8/1971 | Takeuchi........................... | 15/21 E |
| 3,626,538 | 12/1971 | Scheuermann .................... | 15/21 D |

Primary Examiner—Edward L. Roberts
Attorney, Agent, or Firm—Thomas N. Young

[57] ABSTRACT

A car wash apparatus comprising a support frame, a first brush support frame depending from the frame, a second brush support frame depending from the first frame and a horizontal brush carried by the second frame for rotation about a substantially horizontal axis. The double frame permits the brush to contact the top and front and rear end surfaces of a vehicle. Power means in the form of a fluid cylinder are provided for swinging the opposite parallelogram arms of the first frame during engagement of the rotating brush with a vehicle thereby to impart a reciprocating axial displacement to the scrub brush as it contacts a vehicle.

8 Claims, 4 Drawing Figures

U.S. Patent  Feb. 24, 1976  3,939,517
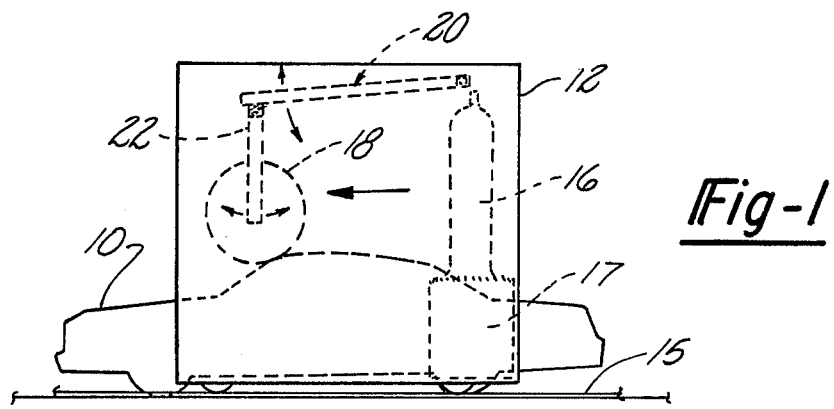
*Fig-1*
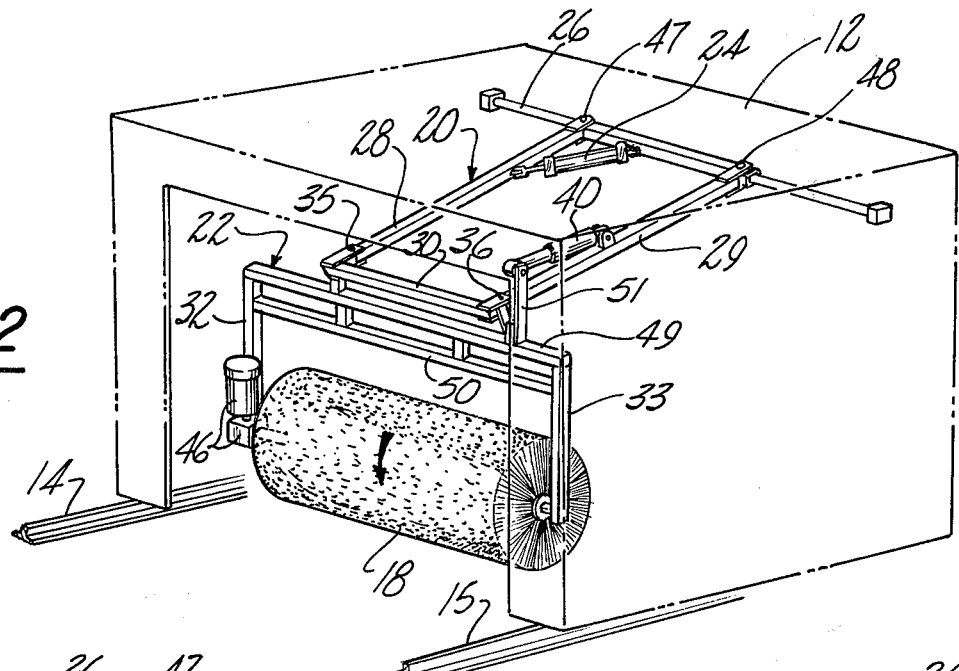
*Fig-2*
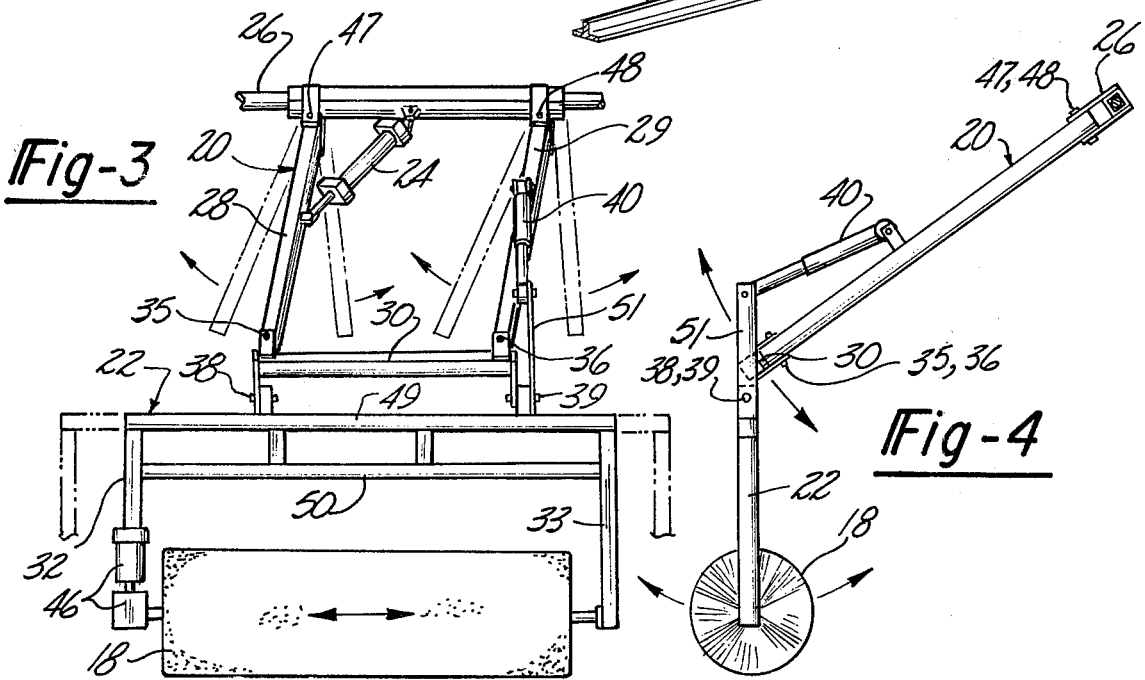
*Fig-3*
*Fig-4*

OVERHEAD BRUSH SYSTEM WITH LATERAL MOVEMENT

INTRODUCTION

This invention relates to car washing systems and particularly to an apparatus within such a system for producing a reciprocating axial displacement of a rotating scrub brush as it contacts a vehicle thereby to enhance the scrubbing action of the brush.

BACKGROUND OF THE INVENTION

The use of substantially cylindrical rotating scrub brushes in automatic and semiautomatic car washing systems is now a wide-spread, if not universal, practice. Vertical side brushes may be mounted on laterally pivotal arrangements for contacting the side surfaces of a vehicle as it travels along a wash lane. Horizontal top brushes may also be suspended from various types of overhead support arrangements to wash the top surfaces of a vehicle as well as the front and rear windows and portions of the front and rear end surfaces of the vehicle. It is well known that the location and configuration of vehicle body and trim members often makes the thorough scrubbing of a vehicle very difficult where only rotating brushes are used since there is little, if any, relative displacement between the vehicle and the brush along the axis of rotation of the brush. Since thoroughness is a virtue in a car washing operation, it is typical to augment the brush wash with hand washing or detergent gun washing, such operations necessarily adding to the cost of operating a car wash business. Accordingly, it is desirable to have an entirely mechanized system which will perform a complete and thorough washing job.

BRIEF SUMMARY OF THE INVENTION

The present invention relates to improvements in car washing systems and in particular to an improvement to the scrubbing action which is provided by a rotating type car wash brush in a car wash system. More specifically, the present invention provides an apparatus whereby a rotating scrub brush, such as, for example, a horizontal top brush, may be reciprocally displaced along its own axis through a relatively short displacement range as it contacts the vehicle thereby to enhance the thoroughness of the scrubbing action of the brush on the vehicle.

In the illustrative embodiment of the invention hereinafter described in greater detail, a horizontal top brush is suspended from an overhead support means and transversely disposed in a vehicle wash lane to contact the top surfaces of the vehicle and, in addition, to contact the front and rear end surfaces of the vehicle as it travels along a wash lane. In addition, the rotating brush apparatus of the illustrative embodiment provides means whereby the support frame is caused to be displaced laterally and reciprocally relative to the wash lane thereby to impart an axial reciprocal displacement to the scrub brush as it contacts the vehicle.

In the preferred form, the support arrangement comprises first and second substantially vertically depending frames, the first frame comprising at least a pair of parallelogram arms and the second frame being pivotally carried between the free ends of the parallelogram arms so as to depend therefrom. The rotating brush is horizontally disposed on the second frame and provided with means, such as a motor, for imparting rotation about a longitudinal axis. Power means, such as a fluid cylinder, are operatively connected with the first frame to impart a reciprocal angular displacement to the parallelogram arms thereby to produce an axial displacement of the scrub brush which is transverse of the washing lane, the parallelogram arms being such as to maintain the horizontal disposition of the brush axis during pivotal swinging motion of the first frame. In addition, the first and second frames are pivotally interconnected to permit relative angular displacement therebetween taken about an axis which is parallel to the brush axis; i.e., transverse of the washing lane. Accordingly, the first frame may be pivoted in such a direction as to carry the brush upwardly while maintaining the vertical depending orientation of the second frame at all times.

The present invention may be embodied in a car washing system wherein the vehicle is pushed, towed, or otherwise caused to be displaced along a wash lane having relatively fixed brush positions. Alternatively, the invention may be embodied in a system wherein the vehicle remains fixed and a carriage supporting the brush system is caused to be displaced over a track or other guide. The following description of the invention shall be made without regard to whichever of such arrangements is chosen in the actual implementation of the invention, it being understood that the material operation of the novel elements of the invention is the same in both cases. Accordingly, while the operation of the illustrative embodiment is often described as involving the "travel" of a vehicle along a wash lane, it is to be understood that such description is equally applicable to the case of relative vehicle-scrub brush displacement caused by movement of a carriage which carries with it the scrub brushes and associated components.

BRIEF DESCRIPTION OF THE DRAWINGS

FIG. 1 is a schematicized side view of a car washing apparatus embodying the invention;

FIG. 2 is a perspective drawing of a displaceable-carriage car wash system having a horizontal top brush mounted for operation in accordance with the invention;

FIG. 3 is a front view of the apparatus of FIG. 2; and,

FIG. 4 is a schematicized side view of the apparatus of FIGS. 2 and 3.

DETAILED DESCRIPTION OF THE SPECIFIC EMBODIMENT

Referring to FIGS. 1 and 2 of the drawings, the illustrative embodiment of the invention is shown in combination with a vehicle 10 in the form of a conventional passenger sedan disposed in a wash lane which is defined by the total area swept by a displaceable tunnel-shaped carriage 12 which is adapted for longitudinal displacement relative to spaced rails 14 and 15. A drive mechanism such as a reversible electric motor and traction system may be provided for producing the displacement of the carriage 12 along rails 14 and 15, such mechanism being entirely conventional and forming no part of the present invention. Carriage 12 provides relative displacement between the vehicle 10 and a system of scrubbing brushes including side brushes 16 and 17 and top brush 18. All of the scrubbing brushes 16, 17, and 18 are preferably of the generally cylindrical, limp-bristle type having longitudinal axes of rotation and adapted for scrubbing contact with the exterior surfaces of the vehicle 10. The axes of rotation of brushes 16 and 17 are substantially vertical and the axis of rotation of brush 18 is substantially horizontal at all times.

The illustrative embodiment of the invention is hereinafter described with specific reference to brush 18 and, accordingly, it may be assumed that the support, displacement and drive apparatus of brushes 16 and 17 is either conventional or otherwise unrelated to the present invention.

Referring now to FIGS. 1 through 4, the brush 18 is supported for displacement along with carriage 12 by means of a support system including a first frame 20 which depends from the upper interior area of the carriage 12 and which provides certain pivotal displacement capabilities to brush 18, and a second frame 22 which is dependingly carried by the first frame 20 and which in turn carries the brush 18. Frame 22 carries an electric drive motor and gear box combination 46 to rotate the brush 18 about its longitudinal axis. The illustrative embodiment of the invention further comprises means for imparting a reciprocal axial displacement to the brush 18 when in contact with the vehicle 10 thereby to enhance the scrubbing action of the rotating brush while it is in contact with the vehicle 10. This means includes a power source in the form of a two-way fluid cylinder 24 which is operatively connected to the frame 20 as hereinafter described.

Frame 20 comprises a rigid cross member 26 supported by the carriage 12 and a pair of spaced parallelogram arms 28 and 29 constructed of rigid materials, such as steel channels or square tubes. Arms 28 and 29 are pivotally connected to member 26 by conventional pin or bearing type pivots 47 and 48. A second rigid cross member 30 is pivotally connected between the parallelogram arms 28 and 29 at a point near the free end thereof. Frame 22 comprises cross braces 49 and 50 secured between rigid end members 32 and 33, the entire frame 22 being pivotally connected to the free ends of the parallelogram arms 28 and 29 by means of pivots 35 and 36. The pivots 35, 36, 47, and 48 permit the parallelogram arms 28 and 29 to be pivotally swung in a transverse plane; i.e., a plane which is transverse to the longitudinal axis of the vehicle 10 and parallel to the axis of rotation of brush 18, while at the same time maintaining the horizontal disposition of the axis of rotation of the brush 18 at all times.

The connections between the free ends of parallelogram arms 28 and 29 and the frame 22 comprise second pivots 38 and 39 which permit the frame 22 to vary in angular relationship to the parallelogram arms 28 and 29 by rotation about a second axis; i.e., a transverse axis which is parallel to frame cross member 34 and the axis of rotation of brush 18. Accordingly, the parallelogram arms 28 and 29 of frame 20 may be swung upwardly toward a horizontal position as illustrated in FIG. 1 while the frame 22 is maintained in a vertical orientation or in such other orientation as may be desired in order to perform a given scrubbing operation. A damper in the form of a conventional hydraulic shock absorber 40 may be operatively connected between frame arm 29 and a strut 51 secured to frame 22, as shown in FIG. 2, to prevent any oscilatory swinging motion or bouncing of the frame 22 relative to the frame 20 when engaged by the vehicle 10.

OPERATION

It can be seen from the foregoing description that the brush 18 is disposed with the axis of rotation transversely across the wash lane and with the frames 20 and 22 depending from the upper area of the carriage 12 so as to initially engage the bristles of brush 18 with the lower front end surface of vehicle 10. It is, moreover, apparent that the brush 18 may be lifted relative to the vehicle 10 by pivoting the arms 28 and 29 upwardly about a pivot axis 42, the pivots 38 and 39 being operative to maintain the arms 32 and 33 in a substantially vertical plane. The frame 20 may be pivotally raised to permit the vehicle 10 to pass completely under the brush 18, maintaining scrubbing contact as it goes, thereby to clean the top surfaces and front and rear windows of the vehicle 10 during the process. Brush 18 may then be again lowered to clean the rear end surface of the vehicle 10 in the completion of the washing operation. The lower position of brush 18 is illustrated in FIG. 4 and the raised position in FIG. 1.

In the course of the washing operation, the scrubbing action of the brush 18 is enhanced by admitting air or other fluid under pressure to the opposite ends of the bidirectional air cylinder 24 by way of lines and valves which are entirely conventional thereby to reciprocally swing the pivot arm 28 through a limited degree of angular displacement relative to the upper cross member 26. This causes the frame 22 and the brush 18 to be reciprocally axially displaced across the vehicle 10 while the motor 46 rotates the brush 18 in the direction shown in FIG. 2. Thus, the brush 18 is given an axial component of displacement to ensure thorough scrubbing regardless of the configuration of the body metal and/or trim components on the front and rear surfaces of the vehicle 10. The parallelogram action provided by pivots 35, 36, 47, and 48 permit the axis of brush 18 to remain substantially horizontal during the swinging oscilation or reciprocation of the frame arms 28 and 29. In addition, pivots 38 and 39 along with shock absorber 40 permit the frame 22 to remain in a substantially vertical plane while the frame 20 is raised and lowered relative to the carriage 12 during normal operation. The axial displacement of the brush 18 may be temporarily stopped while the brush passes over the vehicle antenna mast.

It is to be understood that the invention has been described with reference to a specific embodiment and that various other implementations may be similarly employed in the embodiment of the invention. It will further be understood that the description given above intentionally omits reference to water and soap dispensing means, drying means, wax dispensing means, water reclaiming systems and such other apparatus as may form part of an actual installation, such apparatus being well known in the art.

The embodiments of the invention in which an exclusive property or privilege is claimed are defined as follows;

1. In a car washer assembly: a cylindrical scrubbing brush having a longitudinal axis of symmetry for contacting a vehicle in a wash lane; means for rotating the brush about said axis; support means carrying the brush in a position to contact vehicles in the wash lane with said axis transversely to the lane; and power means operatively connected with said support means for axially reciprocally displacing the brush relative to the wash lane while contacting a vehicle, said support means comprising a first frame suspended over the wash lane and supporting the brush with the axis thereof substantially horizontal for relative displacement over vehicles in the lane; said frame further including first and second pivotal and rigid parallel arms of equal length, the brush being carried by and between the arms, the power means being connected to at least one of the arms to control the angular relation between the arms and the brush thereby to laterally shift the brush relative to the wash lane.

2. Apparatus as defined in claim 1 wherein the first frame further comprises an upper cross member, said first and second rigid parallelogram arms depending from and being pivotally connected to the cross member, the brush being carried by the arms at the ends opposite the cross member, the power means being connected between the cross member and at least one of the arms to control the angular relation therebetween thereby to laterally shift the brush relative to the wash lane.

3. Apparatus as defined in claim 2 wherein the power means comprises a fluid-operated cylinder.

4. Apparatus as defined in claim 1 including a second support frame dependingly carried by the first frame and pivotal with respect thereto about a lateral horizontal axis, the brush being carried by the second frame for lateral movement therewith.

5. Apparatus as defined in claim 4 wherein the first frame comprises an upper cross member, said arms depending from and being pivotally connected to the cross arm at spaced points thereon to form a parallelogram, the apparatus further comprising pivot means pivotally connecting the second frame to the free ends of the parallelogram arms for angular displacement relative to the arms about a lateral axis, the pivot means further providing pivotal angular displacement between the parallelogram arms and the second frame whereby the second frame and the brush axis remains horizontal and laterally related to the wash lane during the pivotal angular displacement of the parallelogram arms.

6. Apparatus as defined in claim 5 wherein the power means comprising a fluid cylinder having a body and an extensible output member connected across the cross member and one of the parallelogram arms to pivotally angularly displace the parallelogram arms of the first frame.

7. Apparatus as defined in claim 6 including damper means connected between the first and second frames to damp relative pivotal motion therebetween.

8. Apparatus as defined in claim 6 wherein the brush is vertically displaceable with the first and second frame between a lowered position wherein the brush engages the front end of the vehicle, and a raised position wherein the brush engages the top of the vehicle.

* * * * *